(12) United States Patent
Sicilia

(10) Patent No.: US 7,510,387 B2
(45) Date of Patent: Mar. 31, 2009

(54) CONTROL SYSTEM FOR DYNAMIC FEED COINJECTION PROCESS

(75) Inventor: Roberto D. Sicilia, Mississauga (CA)

(73) Assignee: Husky Injection Molding Systems Ltd. (CA)

( * ) Notice: Subject to any disclaimer, the term of this patent is extended or adjusted under 35 U.S.C. 154(b) by 885 days.

(21) Appl. No.: 10/879,582

(22) Filed: Jun. 30, 2004

(65) Prior Publication Data

US 2006/0003040 A1    Jan. 5, 2006

(51) Int. Cl.
*B28B 13/00* (2006.01)
*B29C 31/10* (2006.01)

(52) U.S. Cl. .................. 425/130; 425/561; 425/562; 425/573

(58) Field of Classification Search ................ 425/572, 425/573, 130, 557, 561, 562
See application file for complete search history.

(56) References Cited

U.S. PATENT DOCUMENTS

| | | | |
|---|---|---|---|
| 4,124,308 A * | 11/1978 | Sokolow ................ | 366/77 |
| 4,477,242 A * | 10/1984 | Eichlseder et al. ........ | 425/207 |
| 4,609,516 A | 9/1986 | Krishnakumar et al. ..... | 264/255 |
| 4,990,301 A | 2/1991 | Krishnakumar et al. ..... | 264/513 |
| 5,143,733 A * | 9/1992 | Von Buren et al. ......... | 425/130 |
| 6,152,721 A | 11/2000 | Schad et al. ............ | 425/150 |
| 6,540,496 B1 * | 4/2003 | Schad et al. ............ | 425/150 |

FOREIGN PATENT DOCUMENTS

EP      0 624 449 A2    11/1994

* cited by examiner

*Primary Examiner*—Yogendra Gupta
*Assistant Examiner*—Maria Veronica D Ewald
(74) *Attorney, Agent, or Firm*—Katten Muchin Rosenman LLP

(57) ABSTRACT

Coinjection molding system control apparatus and method preferably includes flow control structure and/or steps configured to reduce pressure on a second melt, preferably causing a relatively small portion of a first melt to flow from a distal portion of a first melt channel in the coinjection nozzle into a distal end of a second melt channel in the coinjection nozzle. This prevents substantial amounts of the second melt from being dragged into the mold cavity when the next shot of the first melt is injected.

10 Claims, 10 Drawing Sheets

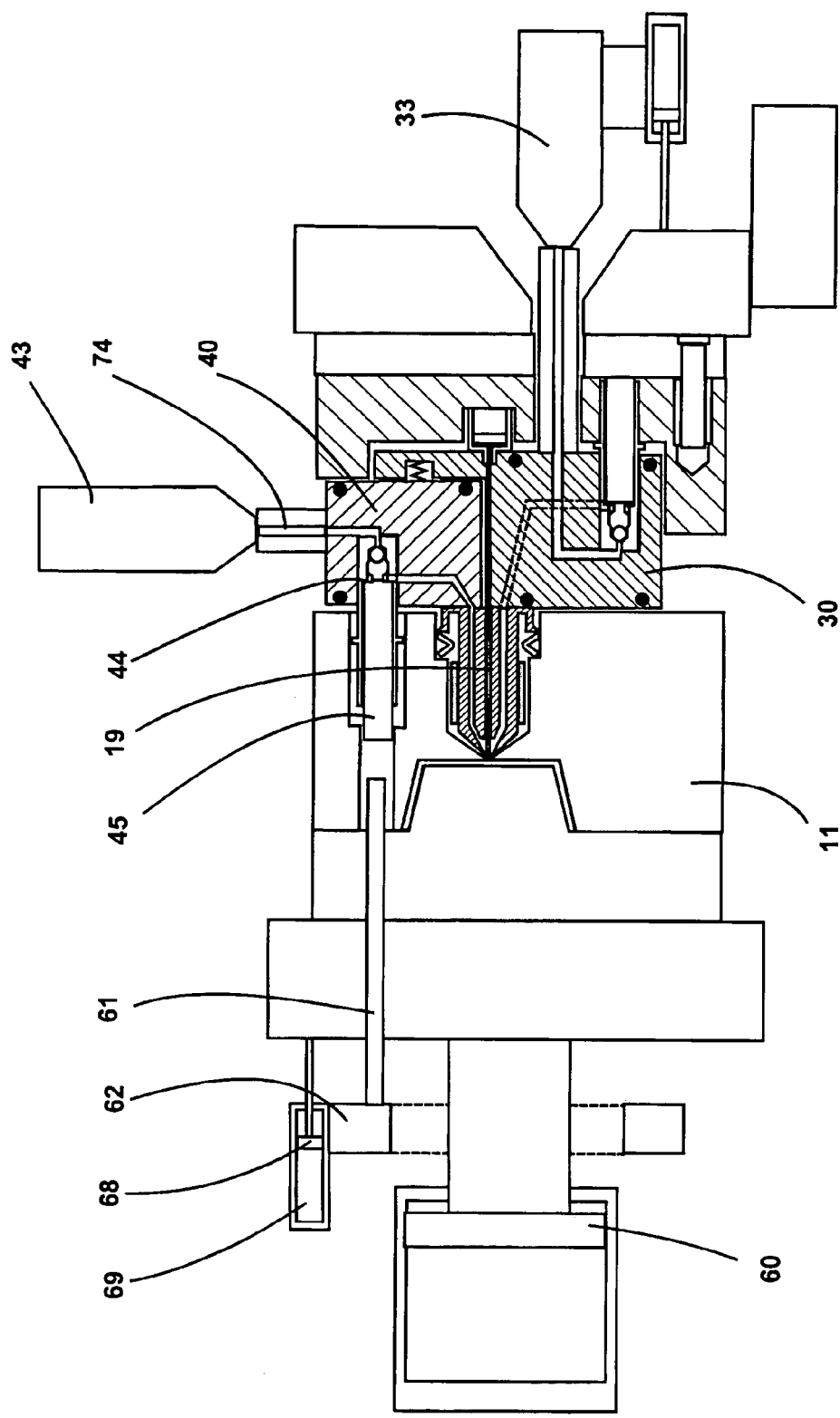

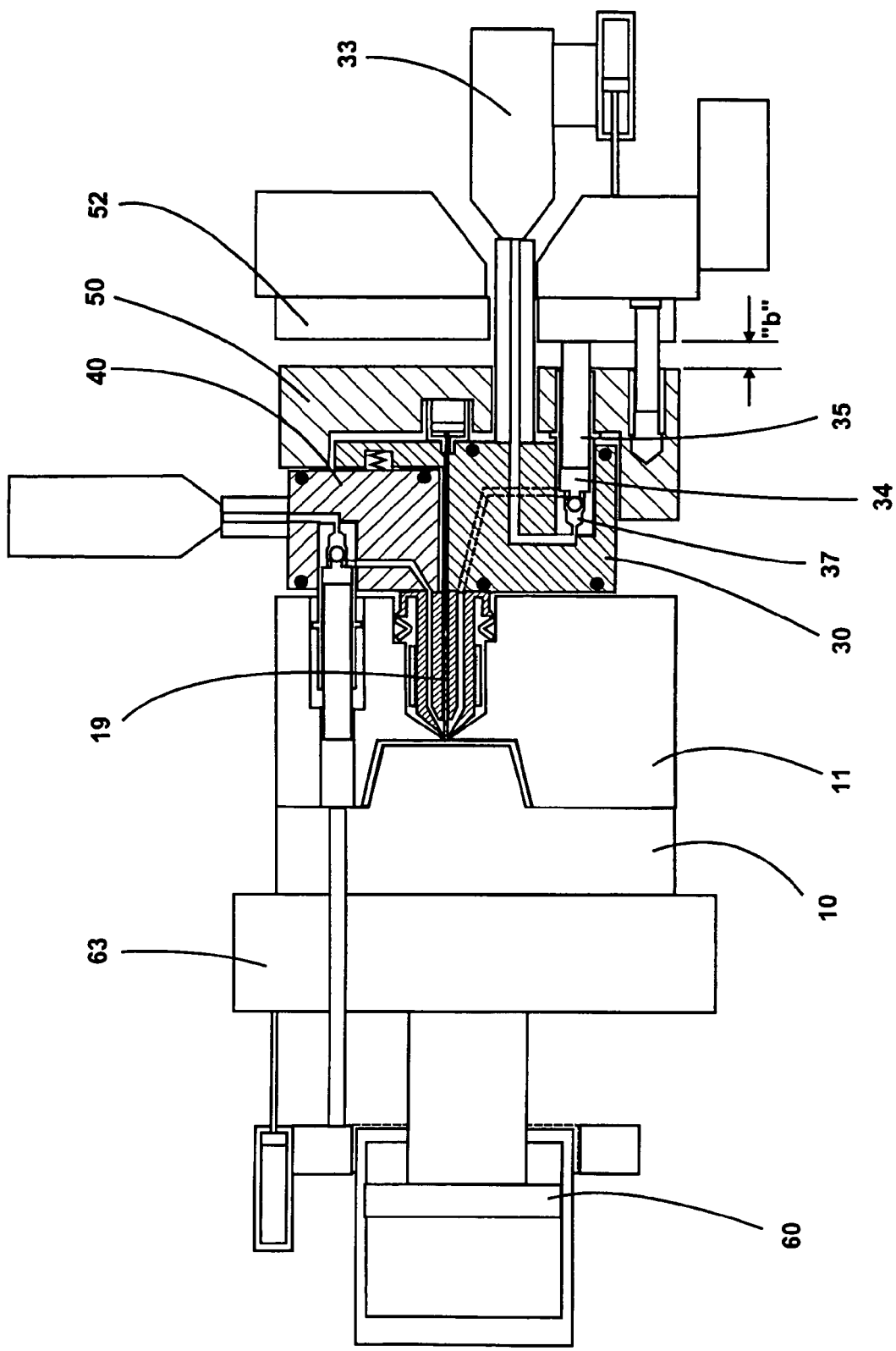
H-786 Fig. 7

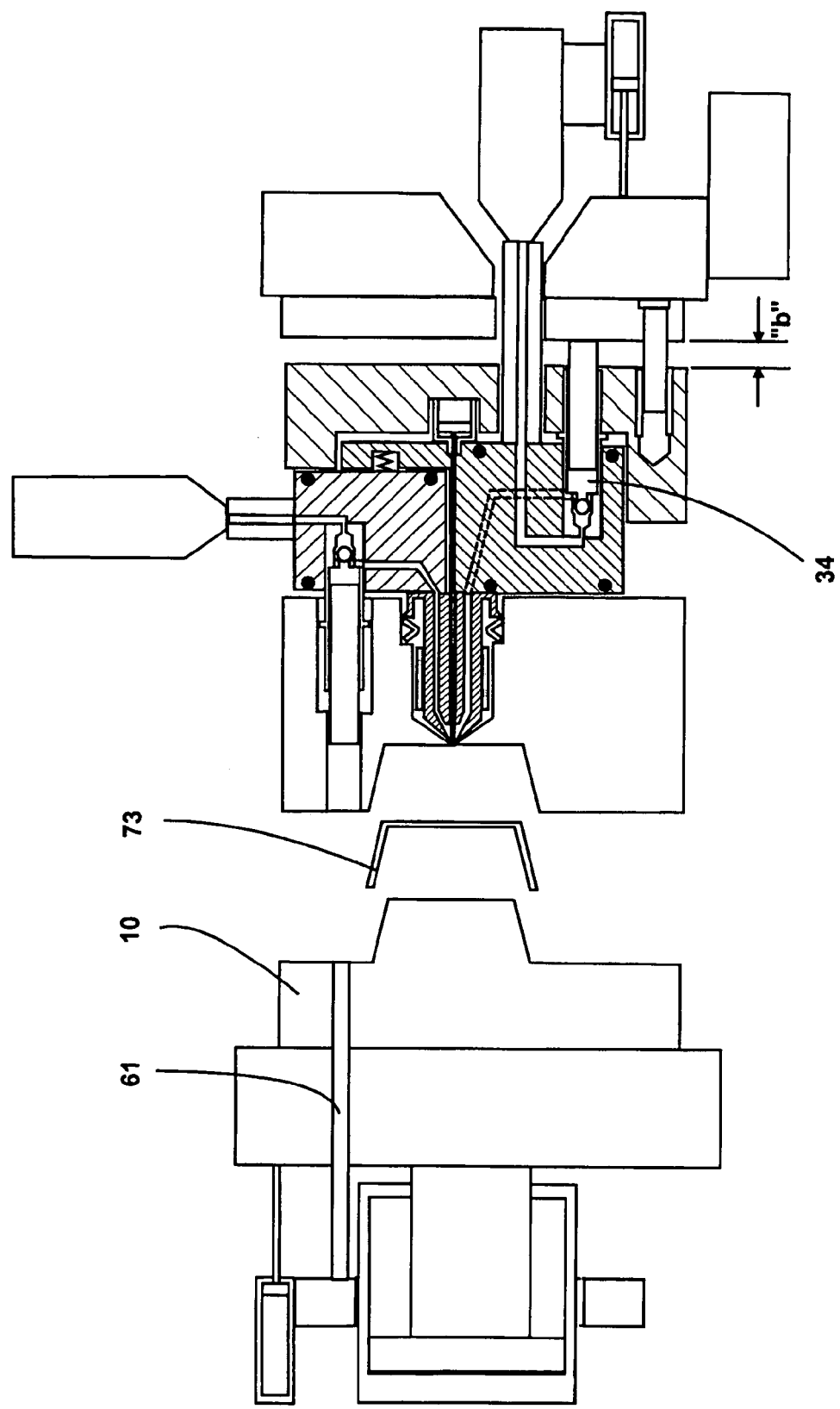

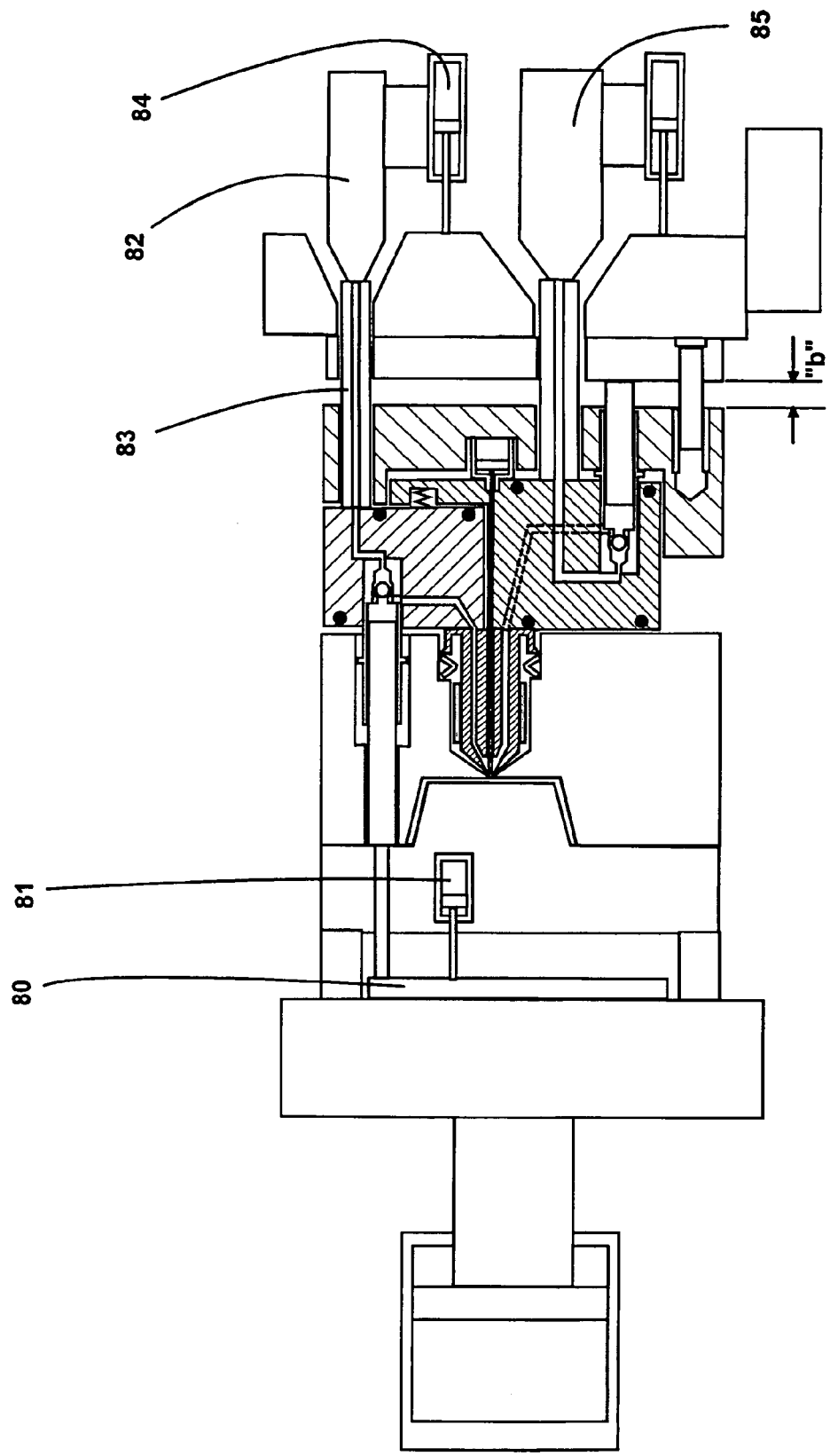
H-786 Fig. 9

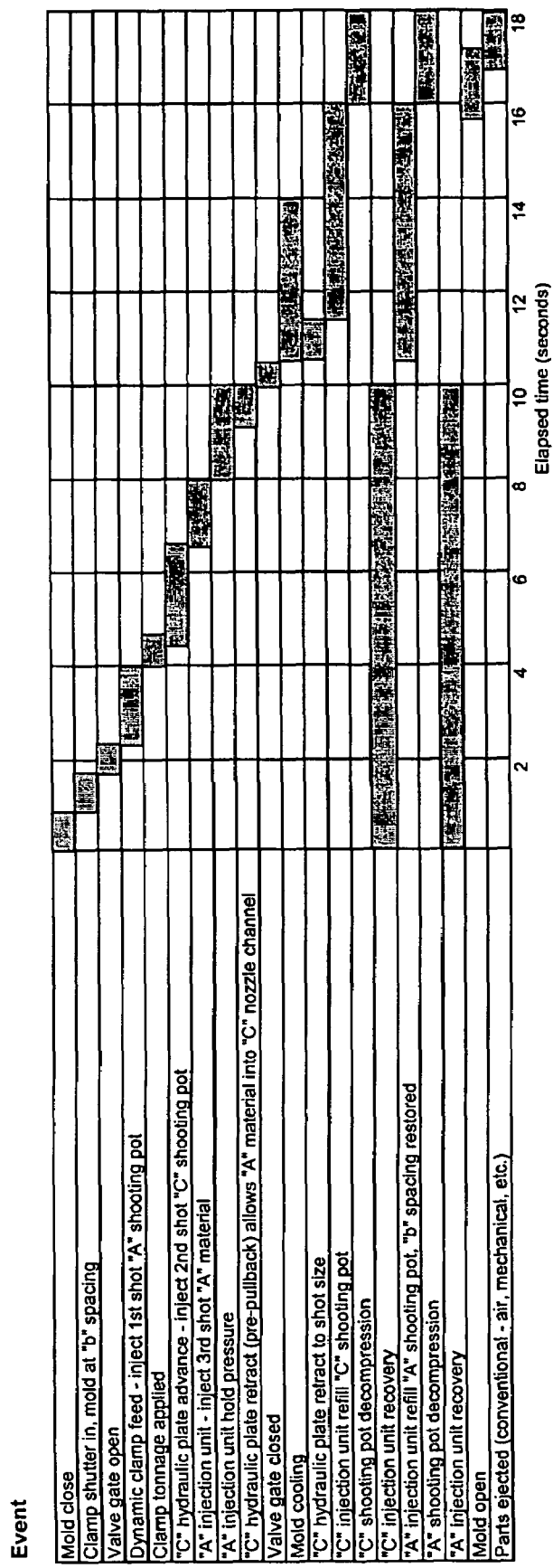
H-786 Figure 10

CONTROL SYSTEM FOR DYNAMIC FEED COINJECTION PROCESS

BACKGROUND OF THE INVENTION

1. Field of the Invention

The present invention relates to control apparatus and method for feeding a melt to a coinjection hot runner system. Preferably, the present invention utilizes a Dynamic Clamp Feed (DCF) to operate at least one of the coinjection shooting pots for injecting at least two melt materials into a mold cavity. Preferably, one of the melt materials is caused to reverse flow into the nozzle melt channel of one of the other materials during the process. Preferably, this decompression step occurs after the refilling of the shooting pots.

2. Description of Related Art

Coinjection molding is typically used to mold multilayered plastic packaging articles having a laminated wall structure. Each layer is typically passed through a different annular or circular passageway in a single nozzle structure and each layer is partially, sequentially, injected through the same gate. Some coinjection hot runner systems include shooting pots to meter material of one plastic resin so that each cavity of a multi-cavity mold receives an accurate dose of that resin in the molding cycle. Such systems may also use shooting pots to exert supplementary pressure on the melt during the molding process. In such systems, a check valve is often used to prevent backflow of resin into the shooting pot during the injection of the resin into the mold cavity.

U.S. Pat. Nos. 4,609,516 and 4,990,301, both to Krishnakumar, disclose coinjection molding processes employing hot runner systems that use shooting pots. Both of these patents disclose sequence charts that show the sequence in which the multiple materials are injected into the mold cavity.

U.S. Pat. No. 6,152,721 to Schad discloses a shooting pot actuator mechanism for operating the shooting pots of a coinjection hot runner system. See also:

U.S. patent application Ser. No. 10/879,576 entitled INJECTION MOLDING MACHINE SHOOTING POT WITH INTEGRAL CHECK VALVE;

U.S. patent application Ser. No. 10/879,581 entitled INJECTION MOLDING MACHINE SPIGOTTED SHOOTING POT PISTON;

U.S. patent application Ser. No. 10/879,621 entitled APPARATUS AND METHOD FOR SEALING INJECTION UNIT AND SPRUE;

U.S. patent application Ser. No. 10/879,575 entitled APPARATUS AND METHOD FOR ACTUATION OF INJECTION MOLDING SHOOTING POTS;

U.S. patent application Ser. No. 10/880,494 entitled HOT RUNNER COINJECTION NOZZLE WITH THERMALLY SEPARATED MELT CHANNELS;

U.S. patent application Ser. No. 10/880,493 entitled COINJECTION MOLDING COOLED SHOOTING POT CYLINDER; and U.S. patent application Ser. No. 10/887,353 entitled APPARATUS AND METHOD FOR INJECTION MOLDING SHOOTING POT WEDGE FEATURE.

With current coinjection nozzle/shooting pot configurations, however, resin material that is trapped between the check valve and the valve gate during the different molding cycle steps remains under pressure. This often results in unwanted drooling or leakage of resin into the valve gate and/or the mold cavity. In more detail, if a second resin in a coinjection nozzle melt channel remains under pressure when the valve gate stem is withdrawn to inject the next shot of the first resin, a portion of the second resin moves to the front of its melt channel and maybe into the gate area. Then, when the next shot of the first resin moves through the gate, it drags along that portion of the second resin. The presence of the second resin in the shot of the first resin may result in a defective part. No known art discloses any means for relieving this build up of pressure between the check valve and the valve gate. Adapting new structures to act as a pressure relief valve would add complicated mechanical structure to the molding machine, leading to increased manufacturing and maintenance costs.

Thus, what is needed is a coinjection molding control structure which can relieve the pressure build up between the check valve and the valve gate during the molding cycle. Preferably, such a solution will require a minimum of new hardware and/or software to implement and maintain.

SUMMARY OF THE INVENTION

It is an advantage of the present invention to overcome the problems of the related art and to provide a coinjection molding machine control system that will relieve the pressure build up between the check valve and the valve gate during the molding cycle. Preferably, the control system is adapted to reduce the pressure on a second resin in a second melt channel of a coinjection nozzle to allow a small amount of a first resin to flow into the valve gate and perhaps into the second melt channel in the coinjection nozzle, thus equalizing the pressures and preventing the second resin from being dragged into the cavity when the next shot of the first resin is injected.

According to a first aspect of the present invention, a novel combination of structure and/or steps are provided for coinjection molding system control apparatus including flow control structure configured to cause a first melt to flow from a first melt channel in a coinjection nozzle into a second melt channel in the coinjection nozzle.

According to a second aspect of the present invention, a novel combination of structure and/or steps are provided for a coinjection mold including a mold cavity having a gate, and a coinjection nozzle having a first melt channel and a second melt channel. The coinjection nozzle is configured to (i) inject a first melt into the mold cavity through the mold gate and the first melt channel, and (ii) inject a second melt into the mold cavity through the mold gate and the second melt channel. A valve stem is configured to open and close the mold gate. A first hot runner manifold is configured to provide the first melt to the first melt channel, and a second hot runner manifold is configured to provide the second melt to the second melt channel. Pressure reducing structure is configured to reduce the pressure on the second melt in the second hot runner manifold before the first melt is injected into the mold cavity.

According to a third aspect of the present invention, a novel combination of steps is provided for a method of preventing, in a coinjection nozzle, a portion of a second melt from being injected into a mold cavity when a first melt is injected through the coinjection nozzle. The pressure on the second melt in the coinjection nozzle is reduced to cause a portion of the first melt to flow from a first melt channel in the coinjection nozzle into a distal end of a second melt channel in the coinjection nozzle.

According to a fourth aspect of the present invention, a novel combination of steps is provided for a method of injection molding a multilayer molded article with first and second melts, including the steps of: (i) injecting the first melt through a first melt channel in a coinjection nozzle, through a valve gate, and into a mold cavity, to form at least a portion of a first layer of the to-be-molded article; (ii) injecting the second melt through a second melt channel in the coinjection nozzle, through the valve gate, and into the mold cavity, to form at least a portion of a second layer of the to-be-molded article; and (iii) reducing pressure on the second melt to cause a distal portion of the second melt to move away from a distal end of the second melt channel.

BRIEF DESCRIPTION OF THE DRAWINGS

Exemplary embodiments of the presently preferred features of the present invention will now be described with reference to the accompanying drawings.

FIG. 6 is a schematic section view of mold in FIG. 1 at the next stage of the molding cycle showing the valve gate closed, the molded part cooling and the "C" shot size set.

FIG. 7 is a schematic section view of the mold in FIG. 1 at the next stage of the molding cycle, showing the "A" injector unit charging the "A" shooting pot and the "C" injector unit charging, or having charged, the "C" shooting pot.

FIG. 8 is a schematic section view of the mold in FIG. 1 at the next stage of the molding cycle, showing the mold in an open position and the part being ejected.

FIG. 9 is a schematic section view of a second embodiment of the mold, showing the "C" shooting pot actuator incorporated in the mold structure and the "C" injector unit mounted alongside the "A" injector unit.

FIG. 10 is a sequence chart that illustrates each step of the molding process.

DETAILED DESCRIPTION OF THE PRESENTLY PREFERRED EXEMPLARY EMBODIMENTS

1. Introduction

The present invention will now be described with respect to several embodiments in which a plastic resin coinjection molding machine injects "A" and "C" resins through a coinjection nozzle into a mold cavity.

Briefly, the preferred embodiments of the present invention provide for the reversing of a melt flow direction of a second resin in the injection nozzle, preferably flowing a first resin into the coinjection nozzle melt channel of the second resin during the molding cycle. This reduces the pressure on the second resin, preventing unwanted transmission of the second resin into the mold cavity. This flow reversal may be accomplished by decompressing the second resin after the refilling of the shooting pots, thus allowing the second resin to reverse-flow, to equalize the pressure on the resins. Preferably, the decompression feature is operated in conjunction with the ball check valve, whereby the check valve prevents the back-flowing second resin from entering the second injector unit. Such a decompression control configuration thus requires no external mechanisms or other hardware to implement, is self-contained, and allows for variable control of decompression volume and/or pressure. In a particularly preferred embodiment, a shaped torpedo can be used as the check valve occlusion, to enhance resin flow performance and responsiveness.

2. The Structure of the Preferred Embodiment

FIGS. 1-8 show schematic section views of a coinjection hot runner mold and some of its details with the system at various stages during a molding cycle to produce a molded part or article having multilayered walls. FIG. 10 is a sequence chart that shows each step in the molding process in sequence, and corresponds to FIGS. 1-8.

Figure 1:
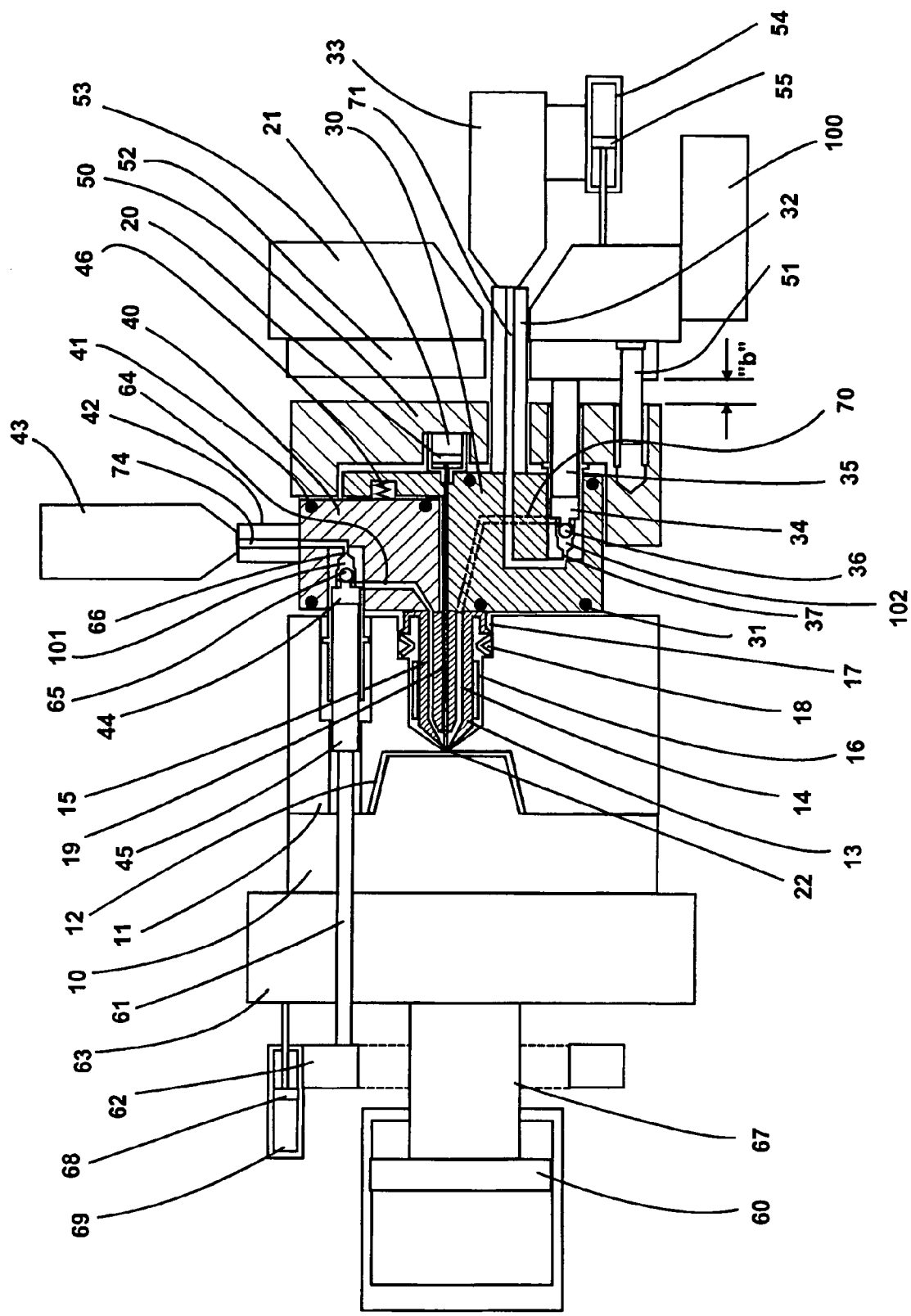
FIG. 1 is a schematic section view of a coinjection hot runner mold according to a preferred embodiment of the present invention, showing the beginning of a molding cycle, with both shooting pots charged and the mold closed.

With reference to FIG. 1, the mold includes a core block 10, a cavity block 11 that together form a mold cavity 12. A coinjection hot runner nozzle 13 includes a first melt channel 14 for conveying a resin "A", and a second melt channel 15 for conveying a resin "C". The nozzle is maintained at operating temperature by a heater 16, is located in the cavity block 11 by a locating insulator 17, and is urged in sealing contact with the manifolds by a spring pack 18. The nozzle 13 also contains a valve stem 19 that is actuated by a piston 20 in a cylinder 21 to open and close a gate 22 that connects melt the channels 14 and 15 to the mold cavity 12.

The mold has two hot runner manifolds. A first hot runner manifold 30 handles the resin "A" and is maintained at optimum operating temperature for the resin "A" by heaters 31. Attached to the first hot runner manifold 30 is a first sprue 32 that conveys the resin "A" from a first machine injection unit 33. Also attached to the first hot runner manifold 30 is a first shooting pot 34 that contains a first shooting pot piston 35. A second hot runner manifold 40 handles the resin "C" and is maintained at optimum operating temperature for the resin "C" by heaters 41. Attached to the second hot runner manifold 40 is a second sprue 42 that conveys the resin "C" from a second machine injection unit 43. Also attached to the second hot runner manifold 40 is a second shooting pot 44 that contains a second shooting pot piston 45. The second hot runner manifold 40 is spaced away from the first hot runner manifold 30, urged by a compensation element 46, to allow the combined first and second manifold configuration to handle the thermal expansion of the components.

Both the first hot runner manifold 30 and the second hot runner manifold 40 are located in a manifold plate 50 that is coupled to the cavity block 11 by fastening means such as bolts (not shown). Both of the manifolds 30 and 40 seal against the nozzle 13 such that their respective melt channels align and seal with their counterpart channels in the nozzle 13 to convey resins "A" and "C", respectively, from the shooting pots 34 and 44 to the mold cavity 12 when the valve stem 19 is open and the respective shooting pot pistons 35 and 45 are actuated.

The manifold plate 50 is located and guided on guide pins 51 mounted in a manifold backing plate 52 that is fastened to a machine stationary platen 53. When the first injection unit 33 charges the first shooting pot 34 with the resin "A", the entry of the resin into the shooting pot displaces the manifold/cavity block assembly away from the manifold backing plate 52 a distance of "b", as shown in FIG. 1. The actuation of a machine clamp piston 60 via a column 67 (that is attached to a moving platen 63) causes the mold assembly to move towards the stationary platen 53, thereby collapsing the distance "b" and causing the first shooting pot piston 35 (which is fixedly coupled to the manifold backing plate 52 and/or the stationary platen 53) to inject the resin "A" from the first shooting pot 34, through a first hot runner melt channel 70, into the first melt channel 14 in the nozzle 13 and thereby into the mold cavity 12. A first ball check valve 36 in a first feed channel 37 prevents backflow of the injected resin into the first injection unit 33. The first injection unit 33 is maintained in sealing contact with the first sprue 32 during these movements of the manifolds and cavity block by means of a first cylinder 54 coupled to the first injection unit 33 and a first piston 55 that is connected to the stationary platen 53.

The second shooting pot piston 45 is actuated by a rod 61 that is connected to a plate 62, which is mounted behind the machine's moving platen 63 and is moved by a second piston 68 disposed in a second cylinder 69. When the second injection unit 43 charges the second shooting pot 44 with the resin "C", the entry of the resin into the shooting pot displaces the second shooting pot piston 45 away from the second hot runner manifold 40 until it contacts the rod 61 that has been position by the plate 62 at the predetermined shot size for resin "C". The forward movement of the plate 62 causes the rod 61 to advance the second shooting pot piston 45 and discharge the resin "C from the second shooting pot 44 via a second hot runner channel 64 in the manifold 40, the second melt channel 15 in nozzle 13, and into the mold cavity 12 via the open valve gate 22. A second ball check valve 65 in a second feed channel 66 prevents backflow of the injected resin into the second injection unit 43. The second injection unit 43 is mounted atop the mold assembly and travels with movable section of the mold, thereby maintaining its sealing contact with the second sprue 42 throughout the molding cycle.

The check valves 36 and 65 preferably use a ball as an occlusion that travels within a check valve chamber having a longitudinal length at least twice as long as the diameter of the ball occlusion. In an alternative embodiment, the check valve chamber length may be equal to or greater than three times the ball diameter, most preferably the chamber length is approximately two times the ball diameter. Since the ball now travels an extended length in the lengthened check valve chamber, this provides some decompression to the resin in the corresponding hot runner melt channel without reducing the shot size within the corresponding shooting pot. In this alternative embodiment, it is preferable that the ball diameter closely match the internal diameter of the check valve chamber to shut off any resin flow around the ball.

In a further alternative embodiment, the check valve occlusion may have a shape other than a ball, in order to provide enhanced resin flow control. For example, the occlusion may comprise a cylinder having one or more conical ends. Or, the occlusion may have an aerodynamic, streamlined shape configured to cooperate with corresponding shapes in the check valve chamber to accomplish precise flow control of the resin. Such occlusions may have one or more longitudinal slots disposed therein to allow passage of resin thereby, under certain circumstances, to provide even more precise flow/pressure control of the resin. These alternative "torpedo" shapes may be used for differential and/or variable pressure control over the resin flowing therethrough. For example, the torpedo may be designed to have a differential pressure across the length thereof.

To control the movements of the various machine elements (e.g., the first and second injection units 33, 43, the clamp piston 60, the plate 62, the second piston and cylinder 68, 69, etc.), any type of controller or processor 100 may be used to control various known actuators (not shown). For example, one or more general-purpose computers, Application Specific Integrated Circuits (ASICs), Digital Signal Processors (DSPs), gate arrays, analog circuits, dedicated digital and/or analog processors, hard-wired circuits, etc., may receive input and provide output to the various controllable components described herein. Instructions for controlling the one or more of such controllers or processors may be stored in any desirable computer-readable medium and/or data structure, such floppy diskettes, hard drives, CD-ROMs, RAMs, EEPROMs, magnetic media, optical media, magneto-optical media, etc.

3. The Process of the First Embodiment

Figure 2:
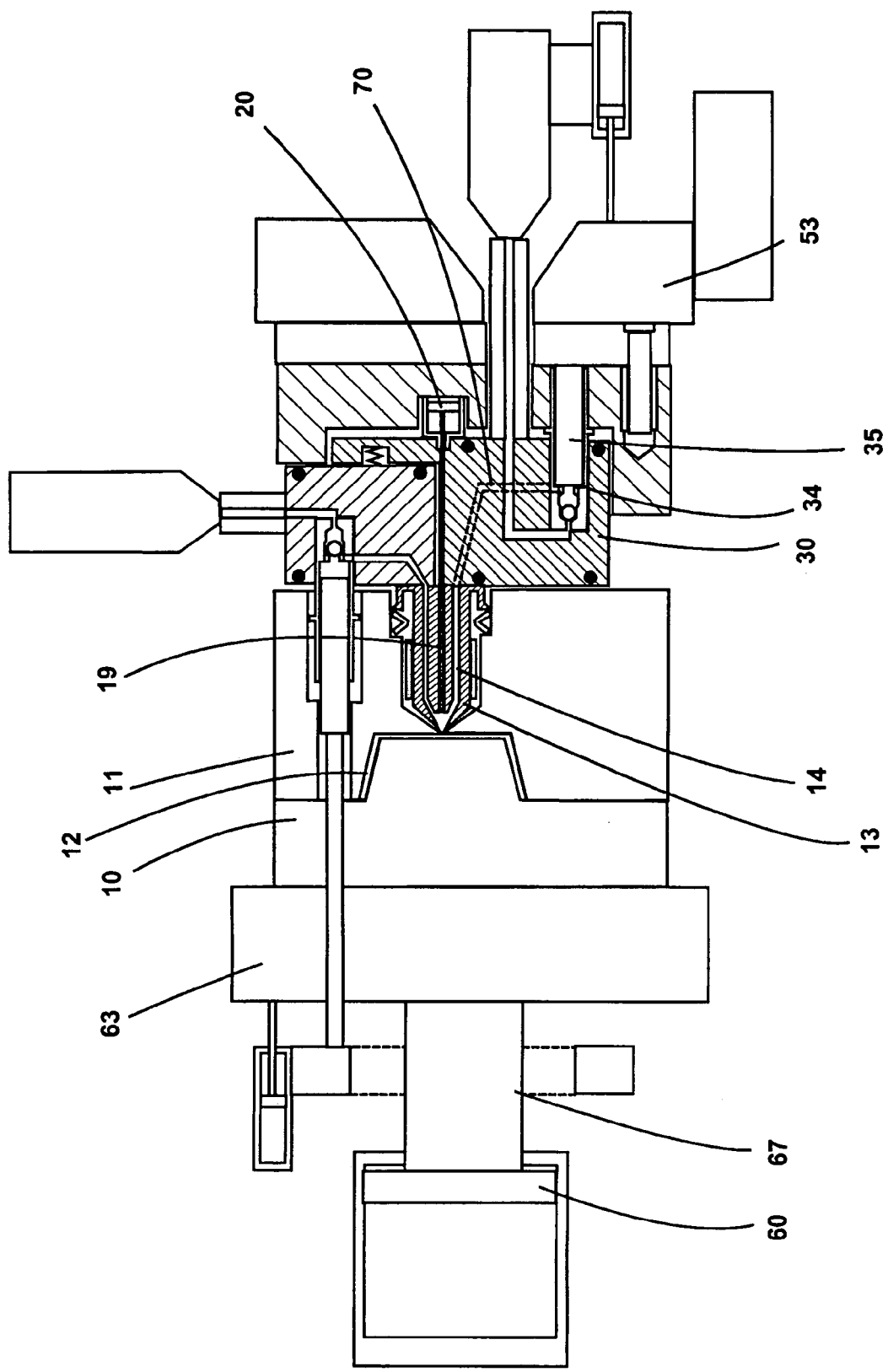
FIG. 2 is a schematic section view of the mold in FIG. 1 at the next stage of the molding cycle, showing the clamp activating one of the shooting pots to inject the "A" resin into the mold.

In operation, the molding cycle starts with the configuration shown in FIG. 1; that is, both of shooting pots 34 and 44 are charged with their respective resins, the valve gate 19 is closed, and the mold core block 10 and the mold cavity block 11 are closed. FIG. 2 shows the next step in the molding cycle. The valve gate 19 has been opened by the valve stem piston 20, the machine clamp piston 60 has been actuated to move the column 67, moving the moving platen 63, the mold core block 10, the mold cavity block 11, and the manifold assembly toward the stationary platen 53 until the distance "b" has been taken up. This action displaces the first shooting pot piston 35 that injects the resin "A" in the first shooting pot 34 into the mold cavity 12 via the first hot runner melt channel 70, and the first melt channel 14 in the nozzle 13. This metered first shot of resin "A" at least partially fills the mold cavity 12.

Figure 3:
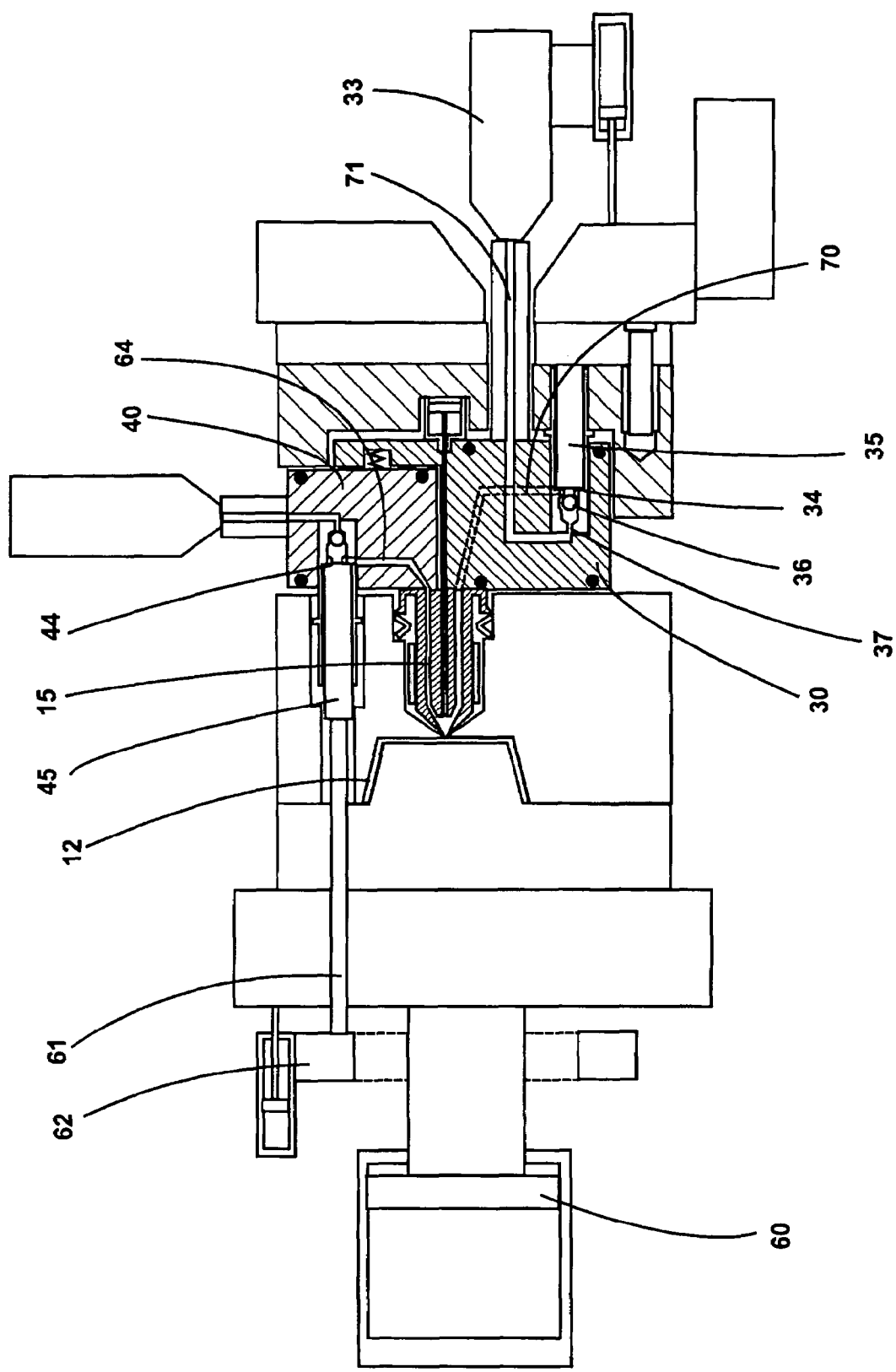
FIG. 3 is a schematic section view of the mold in FIG. 1 at the next stage of the molding cycle, showing the plate behind the moving platen activating the other of the shooting pots to inject the "C" resin into the mold.

FIG. 3 shows the next step in the molding cycle. The plate 62 is actuated to push the rod 61 against the second shooting pot piston 45, which injects the resin "C" in the second shooting pot 44 into the mold cavity 12 via the second hot runner melt channel 64 in the second hot runner manifold 40 and the second melt channel 15 in the nozzle 13. This metered second shot of resin "C" preferably flows within the earlier metered shot of resin "A", pushing the resin "A" further along the cavity and setting up a multilayered wall in the part, in known fashion. The combined amounts of resin injected so far preferably only partially fill the mold cavity 12.

The first injection unit 33 then injects a second shot of the resin "A" (three shots of resin total) directly through a first sprue melt channel 71 in the first sprue 32, the first check valve feed channel 37 in the first shooting pot 34, thereby pushing the ball in the first ball check valve 36 to its open position, as shown. The second shot of resin "A" then travels through the first hot runner melt channel 70 in the first hot runner manifold 30, and finally via the first melt channel 14 in the nozzle 13 to fill and pack the mold cavity 12. Since the mold is clamped closed by the clamp piston 60 at this time, the pressure of the melt flowing through the first sprue melt channel 71 acting on the shooting pot piston 35 cannot enter the shooting pot 34 as the clamp force does not allow the piston 35 to move.

Figure 4:
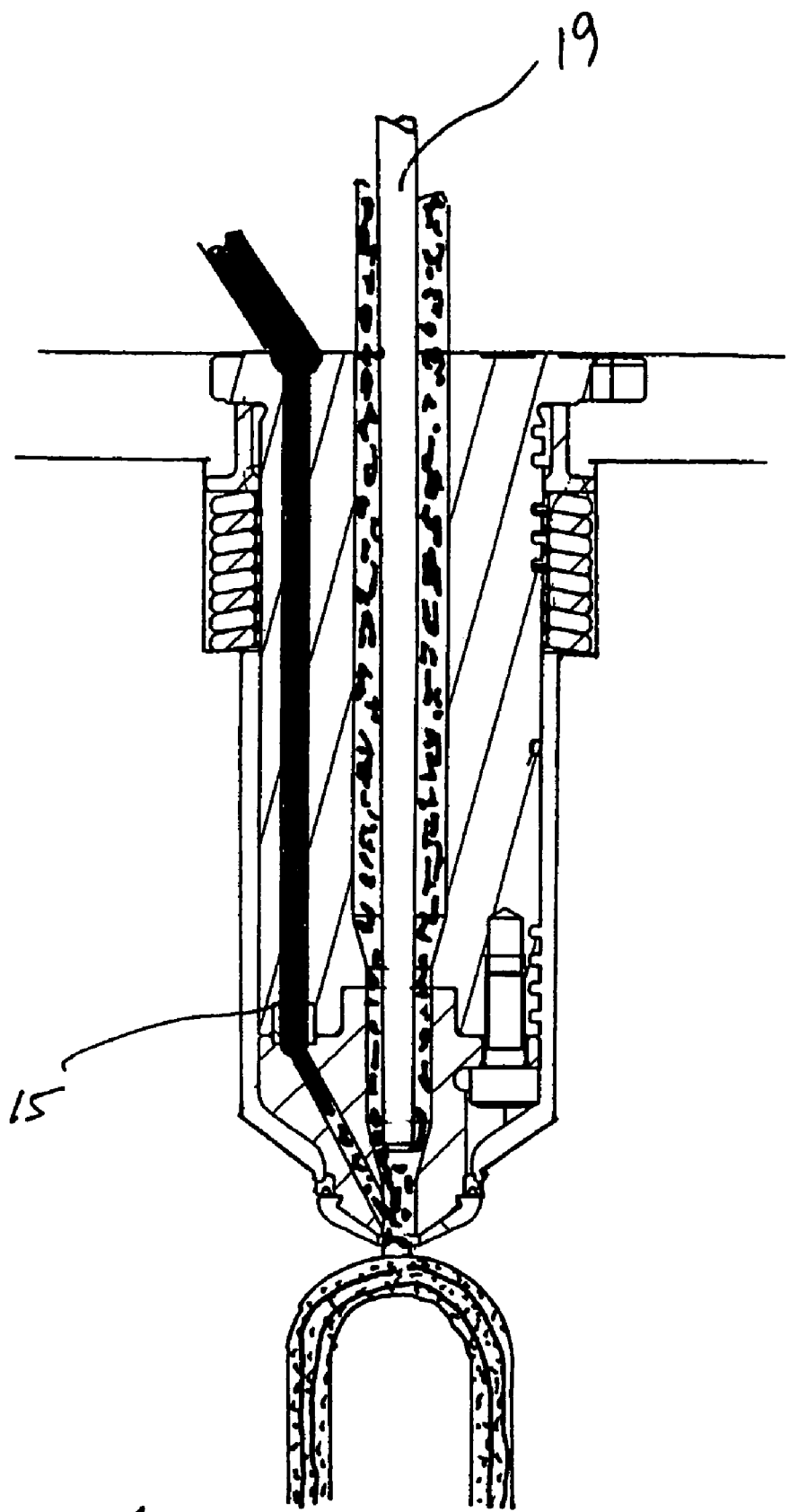
FIG. 4 is a schematic section view of a nozzle assembly of the mold in FIG. 1 at the next stage of the molding cycle, showing the valve stem in the open position and resin "A" being pushed back into the "C" resin channel of the nozzle assembly.

The decompression feature according to the preferred embodiment is shown in greater detail in FIG. 4. The decompression step preferably takes place after the third shot has been injected and the packing stage has commenced. Of course, decompression can take place at any time and in any melt channel/shooting pot combination, depending on the particular injection application. FIG. 4 shows the nozzle assembly 13 of the mold in FIG. 1 at the next stage of the molding cycle, showing the valve stem 19 in the open position and the resin "A" being pushed back into the "C" resin melt channel 15 of the nozzle 13. This is achieved by retracting the plate 62 to pull the rod 61 slightly away (e.g. 1.0 mm) from the second shooting pot piston 45 to a predetermined position called a "pre-pullback" position. The pressurized resin in the "A" melt channel 14 of the nozzle 13, that is packing the molded article via the open gate 22 at this point in the molding cycle, causes a small amount of the distal portion of the "A" resin to bleed from the distal end of the first melt channel 14 and/or from the cavity 12 and/or from the gate 22, into the "C" melt channel 15 in the nozzle 13, until the pressure in the "C" shooting pot balances the "A" resin packing pressure. Thus, the distal portion of the "C" resin moves upward and away from the distal end of the second melt channel 15, preventing significant amounts of the "C" resin from entering the mold cavity when the next shot of the "A" resin is injected.

During this decompression back-flow of resin "C", the "C" resin ball check valve 65 prevents the "C" resin from back-flowing into the "C" injector unit 43, and consequently the "C" shooting pot piston 45 moves back until it contacts the rod 61 held by the plate 62 in this "pre-pullback" position. By allowing a small amount of "A" resin to enter the "C" channel 15 in the nozzle 13, at the beginning of the next molding cycle (when the first shot of "A" resin is injected) no "C" resin will bleed into that first shot. This is advantageous since the first shot of "A" resin should not be contaminated with any "C" resin; otherwise the molded article may have layers with gaps or holes therein, producing a defective part. The presence of a small amount of "A" resin in the "C" resin nozzle melt channel is not disadvantageous since the next shot of "C" resin will be injected into a mold cavity already containing the first shot of "A" resin.

Figure 5:
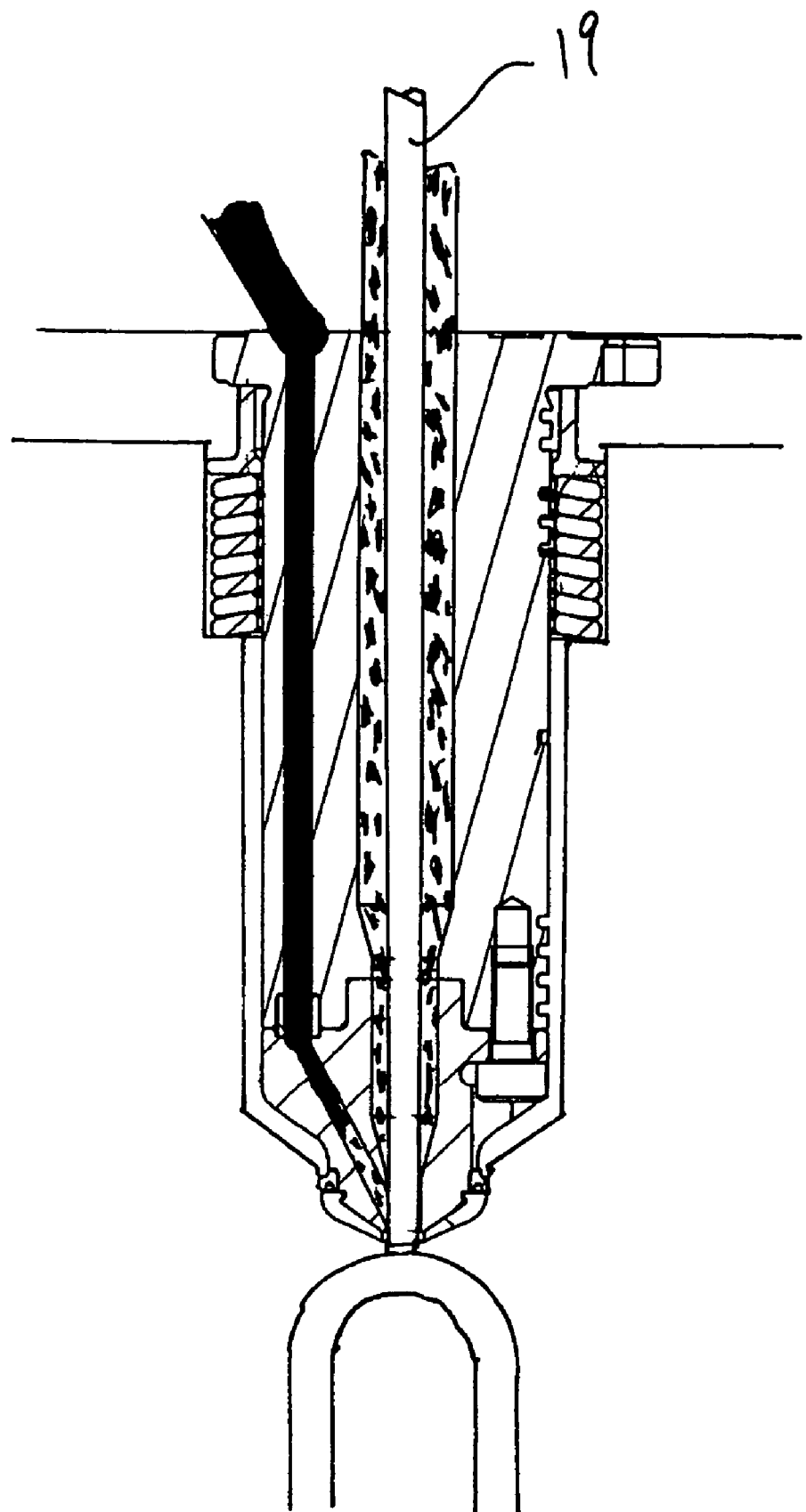
FIG. 5 is a schematic section view of the nozzle assembly of the FIG. 4 embodiment at the next stage of the molding cycle, showing the valve stem in the closed position.

FIG. 5 shows the next stage of the molding cycle where, after a brief interval of packing pressure maintained by the first injection unit 33, the valve stem 19 is closed by the piston 20, and the molded part continues to cool.

FIG. 6 shows the next step in the molding cycle. During the cooling of the molded article or part, the shot size for the "C" shooting pot 44 is set by further retracting the rod 61 to a predetermined "pull back" position. This is done by the second piston 68 operating in the second cylinder 69 to retract the plate 62 to the predetermined position. As the molded part continues to cool, the second shooting pot 44 is recharged with the resin "C" by the second injector 43 feeding the resin "C" through a second sprue melt channel 74. Because the valve stem 19 is in the closed position, the incoming resin "C" can only flow into the second shooting pot 44, thereby displacing the second shooting pot piston 45 until it contacts the rod 61 and the plate 62, thereby limiting the shot size to a predetermined size. A residual pressure remains in the second shooting pot 44 since its piston 45 is restrained from moving by the rod 61. Alternatively, the refilling of the "C" shooting pot 44 can take place simultaneously with the recharging of the "A" resin shooting pot 34, since both manifolds 30 and 40 (and their respective injection units 33 and 43) can be operated independently. After the second shooting pot 44 is refilled, the plate 62 is activated to continue to retract the rod 61, to decompress the resin "C" in the second shooting pot 44, and so that the distal end of rod 61 clears the cavity block 11, as shown in FIG. 7. This ensures that the rod 61 is not exposed above the mold parting line when the mold is opened, as shown in FIG. 8.

FIG. 7 shows that after a predetermined cooling period, the clamp piston 60 is depressurized and the first shooting pot 34 is recharged with resin "A" by the first injection unit 33 feeding the resin "A" through the first check valve feed channel 37. Because the valve stem 19 is in the closed position, the incoming resin "A" can only flow into the first shooting pot 34, thereby displacing the first shooting pot piston 35 that, in turn, pushes the movable mold portion (core block 10, cavity block 11, manifolds 30 and 40, and manifold plate 50) and the moving platen 63, away from the manifold backing plate 52, creating space "b", as shown in FIG. 7. The position of the clamp piston 60 is controlled to stop at a predetermined position in order to set the shot size for the "A" shooting pot 34. Thus, when the incoming resin "A" has filled the first shooting pot 34, a residual pressure remains therein since the shooting pot cylinder has been restrained from moving by the clamp piston 60. The "C" shooting pot, if it has not already been refilled, can be refilled at the same time as the refilling of the "A" shooting pot, as described above as an alternate cycle event.

FIG. 8 shows the final step in the molding cycle. The molded part has cooled sufficiently to be ejected, so the mold is opened, causing the resin "A" in the first shooting pot 34 to decompress, and the molded part 73 is ejected off the core block 10, in a conventional manner. Note that the rod 61 has been retracted to clear the parting line so that a robot may enter to pick up the ejected part, if necessary. Both of the shooting pots 34 and 44 have been refilled and are ready for injection when the mold closes to continue the cycle.

FIG. 9 shows an alternate embodiment in which a "C" shooting pot control plate 80 and its actuation means 81 (preferably a piston and a cylinder, as shown) are configured within the mold core half 10 of the mold. Also, a "C" resin injector unit 82 is mounted alongside the "A" resin injector unit 85 and maintained in sealing contact with the "C" manifold sprue 83 by cylinder means 84 throughout the molding cycle.

FIG. 10 shows a sequence chart of events that represents the complete molding cycle. As shown, the molding cycle begins with the mold core 10 and mold cavity 11 closed and the shooting pots 34 and 44 charged with their respective resins "A" and "C". The space "b" is set between the movable hot runner manifolds 30 and 40 and the manifold plate 50. Thereafter, the valve stem 19 is opened, opening the gate 22. The clamp piston 60 then presses the combined core block, cavity block, and hot runner manifolds toward the manifold plate 50, injecting a metered shot of the resin "A" from the first shooting pot 34 into the cavity 12. The clamp piston 64 applies clamp tonnage to ensure that a predetermined shot of resin "A" is properly injected into the cavity 12. The piston 68 and cylinder 69 then drive the plate 62 and rod 61 so as to discharge the resin "C" from the second shooting pot 44 into the cavity 12. A second shot of resin "A" is injected by the first injection unit 33 until the mold cavity is filled. The first injection unit 33 then maintains a packing pressure briefly. Preferably, the resin "C" is then decompressed by rearward movement of the plate 62, as discussed above. That is, the first injection unit 33 holds the injection pressure while the piston 68 and the cylinder 69 retract the plate 62 and the rod 61, causing the second shooting pot piston 45 to retract, allowing a small amount of the resin "A" to enter the "C" resin melt channel 15 in the nozzle 13, as previously described.

Then, the valve stem 19 is moved forward, closing the valve gate 22. In this configuration, the molded part is cooled. While the part is cooling, the plate 62 is retracted to a predetermined position for the next metered shot of the "C" resin. The second injection unit 43 then recharges the second shooting pot 44 with the resin "C". The "C" resin shooting pot 44 is then decompressed, and the "C" injection unit 43 is recovered. At any time during this process when the mold is not being clamped, the "A" injection unit 33 refills the "A" shooting pot 34, separating the hot runner manifolds 30 and 40 from the stationary platen 53 by the distance "b", as previously described. The "A" shooting pot 34 may be decompressed by manipulation of the distance "b", and the "A" injection unit 33 is then recovered. Finally, the mold is opened and the molded parts are ejected.

4. Conclusion

Advantageous features according to the present invention include:

A coinjection molding process in which one of the resins flows in a reverse direction to enter the melt channel in the nozzle assembly of one of the other resins.

A coinjection molding process in which at least one of the shooting pots is decompressed after refilling and prior to its discharge.

Thus, what has been described is a coinjection molding control system which can relieve the pressure build up on resin between the check valve and the valve gate during the molding cycle, preventing injection of unwanted resin into the mold cavity.

The individual components shown in outline or designated by blocks in the attached Drawings are all well-known in the injection molding arts, and their specific construction and operation are not critical to the operation or best mode for carrying out the invention.

While the present invention has been described with respect to what is presently considered to be the preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

All U.S. and foreign patents and patent applications discussed above are hereby incorporated by reference into the Detailed Description of the Preferred Embodiments.

What is claimed is:

1. Coinjection molding system pressure control apparatus, comprising:

flow control structure configured to cause a first melt to flow from a first melt channel in a coinjection nozzle into a second melt channel in the coinjection nozzle after the first melt and the second melt have been injected into a cavity, wherein said flow control structure comprises:

a second melt shooting pot;

a second melt shooting pot piston; and an actuation structure configured to move said second melt shooting pot piston in a direction which reduces the pressure on the second melt inside said second melt shooting pot.

2. Apparatus according to claim 1, wherein said flow control structure is configured to cause the first melt to flow from the first melt channel of the coinjection nozzle, through a valve gate, and into the second melt channel in the coinjection nozzle.

3. Apparatus according to claim 1, wherein said flow control structure is configured to cause a decompression of the second melt in a second hot runner manifold.

4. Apparatus according to claim 1, wherein said flow control structure further comprises:

a valve stem; a valve stem piston;

a valve stem piston actuator; and a controller configured to control said valve stem piston actuator and said actuation structure.

5. Apparatus according to claim 4, further comprising the coinjection nozzle, which is configured to hold said valve stem.

6. A coinjection mold, comprising:

a mold cavity having a gate;

a coinjection nozzle having a first melt channel and a second melt channel, said coinjection nozzle being configured to (i) inject a first melt into said mold cavity through said mold gate and said first melt channel, and (ii) inject a second melt into said mold cavity through said mold gate and said second melt channel;

a valve stem configured to open and close said mold gate;

a first hot runner manifold configured to provide the first melt to said first melt channel;

a second hot runner manifold configured to provide the second melt to said second melt channel;

pressure reducing structure configured to reduce the pressure on the second melt in the second hot runner manifold before the first melt is injected into said mold cavity;

a first shooting pot configured to inject the first melt into the first hot runner manifold;

a first shooting pot piston configured to discharge the first melt from said first shooting pot;

a second shooting pot configured to inject the second melt into the second hot runner manifold; and a second shooting pot piston configured to discharge the second melt from said second shooting pot, and wherein said pressure reducing structure reduces the pressure of the second melt in the second hot runner manifold by withdrawing the second shooting pot piston a predetermined distance from the second shooting pot.

7. A coinjection mold according to claim 6, wherein pressure reducing structure is configured to reduce the pressure on the second melt in the second hot runner manifold to an extent that causes a portion of the first melt to flow into a portion of the second melt channel.

8. A coinjection mold according to claim 6, wherein said pressure reducing structure reduces the pressure of the second melt in the second hot runner manifold after the second shooting pot has been charged and before it has been discharged by said second shooting pot piston.

9. A coinjection mold according to claim 8, further comprising:

a first check valve configured to control a flow of the first melt from a first injection unit to said first hot runner manifold; and a second check valve configured to control a flow of the second melt from a second injection unit to said second hot runner manifold, said second check valve being configured to prevent backflow of the second melt into said second injection unit when said pressure reducing structure reduces the pressure of the second melt in the second hot runner manifold.

10. A coinjection mold according to claim 9, wherein said second check valve includes a valve occluding torpedo having a non-spherical shape.

* * * * *